US012291636B2

(12) United States Patent
Dong et al.

(10) Patent No.: US 12,291,636 B2
(45) Date of Patent: May 6, 2025

(54) BIODEGRADABLE POLYMERIC MATERIAL, BIODEGRADABLE PRODUCTS AND METHODS OF MANUFACTURE AND USE THEREFOR

(71) Applicant: Erthos Inc., Mississauga (CA)

(72) Inventors: Chang Dong, Mississauga (CA); Kritika Tyagi, Mississauga (CA); Nima Zarrinbakhsh, Mississauga (CA); Hossein Abdoli, Mississauga (CA); Jiahui Wen, Shenzhen (CN)

(73) Assignee: Erthos, Inc., Mississauga (CA)

( * ) Notice: Subject to any disclaimer, the term of this patent is extended or adjusted under 35 U.S.C. 154(b) by 680 days.

(21) Appl. No.: 17/561,279

(22) Filed: Dec. 23, 2021

(65) Prior Publication Data

US 2022/0275201 A1 Sep. 1, 2022

(30) Foreign Application Priority Data

Jan. 29, 2021 (CN) .......................... 202110129521.7

(51) Int. Cl.
*C08L 67/04* (2006.01)
*C08L 67/02* (2006.01)

(52) U.S. Cl.
CPC .............. *C08L 67/04* (2013.01); *C08L 67/02* (2013.01); *C08L 2201/06* (2013.01); *C08L 2205/02* (2013.01)

(58) Field of Classification Search
CPC ...................................................... C08L 67/04
See application file for complete search history.

(56) References Cited

U.S. PATENT DOCUMENTS

| | | | |
|---|---|---|---|
| 5,288,318 A | 2/1994 | Mayer et al. | |
| 5,362,777 A * | 11/1994 | Tomka | C08J 3/20 |
| | | | 127/71 |
| 5,393,804 A | 2/1995 | George et al. | |
| 5,500,465 A | 3/1996 | Krishnan et al. | |
| 6,013,116 A | 1/2000 | Major et al. | |
| 6,730,724 B1 | 5/2004 | Bastioli et al. | |
| 7,241,832 B2 * | 7/2007 | Khemani | C08L 77/12 |
| | | | 525/413 |
| 10,975,213 B2 | 4/2021 | Dong et al. | |
| 2006/0199881 A1 | 9/2006 | Xu | |
| 2007/0020217 A1 | 1/2007 | Themens | |
| 2008/0203606 A1 | 8/2008 | Xu | |
| 2009/0311455 A1 | 12/2009 | Bastioli et al. | |
| 2010/0003434 A1 | 1/2010 | Bastioli et al. | |
| 2010/0297458 A1 | 11/2010 | Khemani et al. | |
| 2017/0058109 A1 | 3/2017 | Nguyen et al. | |
| 2017/0355179 A1 | 12/2017 | Sehanobish et al. | |
| 2018/0127554 A1 * | 5/2018 | Mohanty | C08K 11/00 |
| 2024/0093023 A1 | 3/2024 | Zarrinbakhsh | |

FOREIGN PATENT DOCUMENTS

| | | |
|---|---|---|
| CA | 2142134 A1 | 8/1995 |
| CA | 2476799 A1 | 8/2003 |
| CA | 2205071 C | 1/2005 |
| CA | 2582948 A1 | 4/2006 |
| CA | 2601181 A1 | 9/2006 |
| CA | 2889039 A1 | 5/2014 |
| CA | 3143851 A1 | 7/2022 |
| CN | 101506291 A | 8/2009 |
| CN | 101712775 A | 5/2010 |
| CN | 106881929 A | 6/2017 |
| CN | 107522904 A | 12/2017 |
| CN | 110845830 A | 2/2020 |
| KR | 102087007 B1 | 3/2020 |
| WO | WO-2016109196 A1 | 7/2016 |
| WO | WO-2020034029 A1 | 2/2020 |
| WO | WO-2022160032 A1 | 8/2022 |
| WO | WO-2024057286 A1 | 3/2024 |

OTHER PUBLICATIONS

Office Action for Chinese Application No. CN20198054172 dated Mar. 15, 2023, 8 pages.
Office Action for Chinese Application No. CN202110129521 dated Mar. 5, 2023, 9 pages.
Office Action for Chinese Application No. 201980054172.8 dated Oct. 21, 2022, 8 pages.
Office Action for Chinese Application No. 201980054172.8, dated Mar. 15, 2023, 13 pages (with full English translation).
International Preliminary Report on Patentability for International Application No. PCT/CA2021/051886 dated Aug. 10, 2023, 8 pages.
Office Action for Chinese Application No. 202110129521.7, mailed May 27, 2023, and English translation, 14 pages.
Office Action for Chinese Application No. CN20198054172 dated Jun. 14, 2023, and English translation, 11 pages.
International Search Report and Written Opinion for Application No. PCT/CA2019/051101, mailed Oct. 29, 2019, 9 pages.
International Search Report and Written Opinion for Application No. PCT/CA2021/051886, mailed Mar. 29, 2022, 12 pages.
Office Action for Chinese Application No. 202110129521.7, mailed Aug. 1, 2022, 13 pages.
Co-pending U.S. Appl. No. 18/468,261, inventor Zarrinbakhsh; Nima , filed on Sep. 15, 2023.
Da Silva M N, et al., "PBAT/TPS Composite Films Reinforced with Starch Nanoparticles Produced by Ultrasound", International Journal of Polymer Science, Dec. 2017, pp. 1-10.
International Search Report and Written Opinion for PCT Application No. PCT/IB2023/059203 dated Nov. 23, 2023, 10 pages.
Co-pending U.S. Appl. No. 18/404,468, inventors Abdoli; Hossein et al., filed on Jan. 4, 2024.

(Continued)

*Primary Examiner* — Michael F Pepitone
(74) *Attorney, Agent, or Firm* — Cooley LLP

(57) ABSTRACT

The invention encompasses biodegradable compositions (e.g., biodegradable plastics) and methods of preparation and use thereof, and disposable products made from the claimed compositions. Raw materials for preparing the biodegradable plastic include one or more polymers, fiber, starch, a plasticizer, and a coupling agent. The biodegradable composition has the advantages of short degradation cycle, good mechanical properties, and a low manufacturing cost.

22 Claims, No Drawings

(56) References Cited

OTHER PUBLICATIONS

Co-pending U.S. Appl. No. 18/404,476, inventors Ogunsona; Emmanuel Olusegun et al., filed on Jan. 4, 2024.
Co-pending U.S. Appl. No. 18/404,492, inventors Ogunsona; Emmanuel Olusegun et al., filed on Jan. 4, 2024.
Co-pending U.S. Appl. No. 18/404,500, inventors Ogunsona; Emmanuel Olusegun et al., filed on Jan. 4, 2024.
Co-pending U.S. Appl. No. 18/404,507, inventors Abdoli; Hossein et al., filed on Jan. 4, 2024.
Office Action for Canadian Application No. CA20213143851 mailed Sep. 20, 2023, 5 pages.

* cited by examiner

BIODEGRADABLE POLYMERIC MATERIAL, BIODEGRADABLE PRODUCTS AND METHODS OF MANUFACTURE AND USE THEREFOR

This application claims priority to and the benefits of Chinese Patent Application No. 202110129521.7 filed on Jan. 29, 2021, the disclosure of which is hereby incorporated by reference in its entirety for all purposes.

FIELD OF THE INVENTION

The present invention relates to the technical field of biodegradable materials, and in particular, to biodegradable plastics and methods of manufacture and use thereof including disposable, biodegradable products.

BACKGROUND OF THE INVENTION

Biodegradable plastics are of increasing industrial interest as replacements for non-biodegradable plastics in a wide range of applications and in particular for packaging applications and for consumer products.

Conventional disposable plastic products are mainly manufactured from petroleum-derived polystyrene. Such products provide great convenience, but are extremely difficult to degrade, and may take centuries to degrade by landfilling.

Plastic materials such as polypropylene and polystyrene are presently used in enormous quantities in the manufacture of articles such as, for example, containers, disposable utensils, storage materials, and packaging materials. Modern processing and packaging technology allows a wide range of liquid and solid goods to be stored, packaged, and shipped in packaging materials while being protected from harmful elements, such as gases, moisture, light, microorganisms, vermin, physical shock, crushing forces, vibration, leaking, or spilling. Many of these materials are characterized as being disposable, but actually have little, if any, functional biodegradability. For many of these products, the time for degradation in the environment can span centuries.

Each year, thousands of tons of plastic are used in storing and dispensing soft drinks, juices, processed foods, grains, beer and other products.

Packaging materials (e.g., plastic, polystyrene) are to varying extents, damaging to the environment. For example, the manufacture of polystyrene products involves the use of a variety of hazardous chemicals and starting materials, such as benzene (a known mutagen and a probable carcinogen). Chlorofluorocarbons (or "CFCs") have also been used in the manufacture of "blown" or "expanded" polystyrene products. CFCs have been linked to the destruction of the ozone layer.

Due to widespread environmental concerns, there has been significant pressure on companies to discontinue the use of non-biodegradable products in favor of more environmentally safe materials. Degradability is a relative term. Some products which appear to be degraded merely break apart into very small pieces. These pieces are hard to see, but can still take centuries to actually break down. Other products are made from materials which undergo a more rapid breakdown than non-biodegradable products.

Biodegradable plastics may be divided into four categories: biodegradable plastics, photobiodegradable plastics, photo-biodegradable plastics and water-biodegradable plastics. Biodegradable plastics may be divided into bio-based biodegradable plastics and petroleum-based biodegradable plastics based on raw materials. Petroleum-based biodegradable plastics are plastics produced from non-renewable sources. Bio-based biodegradable plastics are plastics produced from biomass, with less dependence on petroleum.

However, mechanical properties of existing biodegradable plastics are relatively poor. In addition, the manufacturing cost of existing biodegradable materials is relatively high. There remains a need to provide a biodegradable product that is strong, stable, and can be readily and inexpensively made. Furthermore, there is a need to develop a robust method to develop compostable products that can be used to hold dry, wet or damp material at a range of temperatures.

By blending certain polymers, materials with improved biodegradable properties and processing are obtained in the instant invention.

SUMMARY OF THE INVENTION

The invention encompasses a biodegradable composition with good mechanical properties to solve the problems of poor mechanical properties and a high manufacturing cost of existing biodegradable plastics.

In addition, the invention further provides a method for preparing the biodegradable plastic with good mechanical properties and a low manufacturing cost and a disposable product with good mechanical properties and a low manufacturing cost.

Accordingly, the invention generally encompasses a biodegradable composition comprising:
  (i) about 10 to about 95% (w/w) of a polymer comprising one or more of biodegradable aliphatic-aromatic polyesters,
  (ii) about 0.1 to about 50% (w/w) of starch,
  (iii) about 0.1 to about 50% (w/w) of one or more of inorganic filler
  (iv) about 0.1 to about 50% (w/w) of fiber comprising one or more of biomass,
  (v) optionally about 0 to about 15% (w/w) of one or more of plasticizer, and
  (vi) optionally about 0 to about 10% (w/w) of one or more of coupling agent or compatibilizer.

In certain embodiments, the composition exhibits a 90% disintegration completion within 180-365 days, on average, in soil at ambient temperature, and In certain embodiments, the composition exhibits a disintegration onset within about 7 days, on average, in soil at ambient temperature.

In certain embodiments, the composition exhibits a bio-based carbon content of more than 50%.

In certain embodiments, the composition exhibits a rigidity (represented by 1% secant flexural modulus) of greater than 1000 Mpa.

In certain embodiments, the composition exhibits a strength (represented by maximum flexural stress) of greater than 30 Mpa.

In certain embodiments, the composition exhibits an impact strength (represented by notched Izod energy) of more than 30 J/m.

In certain embodiments, the composition exhibits a MFI (melt flow index or melt flow rate) of greater than 10 g/10 min.

In certain embodiments, the composition exhibits a MFI (melt flow index or melt flow rate) of less than 10 g/10 min.

In certain embodiments, the composition exhibits a MFI (melt flow index or melt flow rate) of greater than 1 g/10 min, 5 g/10 min, 10 g/10 min, 15 g/10 min, 20 g/10 min, 25 g/10 min, or 30 g/10 min.

In certain embodiments, the biodegradable aliphatic aromatic polyester is polylactic acid, polycaprolactone, polybutylene succinate, polybutylene succinate adipate, polybutylene succinate terephthalate, polybutylene adipate terephthalate, or polyhydroxyalkanoates.

In certain embodiments, the starch is in native form or modified form including, but not limited to, thermoplastic starch.

In certain embodiments, the biomass includes, but is not limited to, vinasse, vinegar residues, wood fiber, agricultural cellulosic matter from including straw, stalk, shive, hurd, bast, leaf, seed, fruit, and perennial grass, all in a non-continuous non-woven form including chopped pieces, particulates, dust or flour.

In certain embodiments, the inorganic filler includes, but is not limited to, wollastonite, mica, clay, calcium carbonate, glass fiber, talc, aluminum silicate, zirconium oxide, and gypsum.

In certain embodiments, the plasticizer includes, but is not limited to, glycerin, ethylene glycol, xylitol, vegetable oils (virgin or epoxidized), and natural waxes.

In certain embodiments, the coupling agent or compatibilizer includes, but is not limited to, titanate, aluminate, γ-aminopropyltriethoxysilane, γ-(2,3)epoxy (propoxy)propyltrimethoxysilane and γ-methacryloxypropyltrimethoxysilane.

In certain embodiments, the biodegradable composition further comprises one or more additives including, but not limited to, impact modifier in an amount of about 0.1 to about 30% (w/w), chain extender, lubricant, biodegradable stabilizer, toner, pigment, initiator, antistatic agent, flame retardant, and antioxidant each present in an amount of about 0.1 to about 10% (w/w).

In certain embodiments, the composition includes a toner or pigment including, but not limited to, a fluorescent brightener and titanium dioxide.

In other embodiments, the invention encompasses a method for preparing the biodegradable composition comprising the following steps:

plasticizing a starch with the plasticizer;

mixing uniformly with other raw materials of the biodegradable composition to prepare a premix;

mixing the premix thoroughly at higher than ambient temperatures to prepare the biodegradable composition.

In other embodiments, the invention encompasses a method for preparing the biodegradable composition comprising the following steps:

mixing uniformly all materials of the biodegradable composition to prepare a premix, and then mixing the premix thoroughly at higher than ambient temperatures to prepare the biodegradable composition.

In certain embodiments, the method includes preparing biodegradable rigid parts from the biodegradable composition via conventional polymer processing techniques including, but not limited to, injection molding, compression molding, blow molding and extrusion molding.

In certain embodiments, the method includes preparing biodegradable sheets, thin sheets or films and the articles thereof from the biodegradable composition via conventional polymer processing techniques including, but not limited to hot press, vacuum forming, cast extrusion, film blowing and compression molding.

In certain embodiments, the invention encompasses a disposable product, comprising the biodegradable composition, wherein the disposable product is packing material or a consumer product.

In various embodiments, the invention encompasses biodegradable compositions (e.g., biodegradable plastics) and methods of preparation and use thereof, and disposable products made from the biodegradable compositions. In certain embodiments, raw materials for preparing the biodegradable plastic include, in parts by mass, about 10 to about 95 parts (w/w) of one or more polymers, preferably one or more of biodegradable aliphatic aromatic polyesters, about 0.1 to about 50 parts (w/w) of starch, about 0.1 to about 50 parts (w/w) of an inorganic filler, about 0.1 to about 50 parts (w/w) of fiber, preferably one or more from biomass, about 0 to about 15 parts (w/w) of plasticizer, and about 0 to about 5 parts (w/w) of coupling agent, wherein the polymer is at least one selected from the group consisting of polylactic acid, polycaprolactone, polybutylene succinate, polybutylene succinate adipate, polybutylene succinate terephthalate, polybutylene adipate terephthalate, and polyhydroxyalkanoates, and the fiber is at least one selected from the group consisting of vinasse, vinegar residue, wood flour and straw.

The combination of the polymer, the fiber, the starch, the plasticizer and the inorganic filler in the methods of manufacture provide the advantageous mechanical properties of the biodegradable plastic, which are improved. In certain embodiments, the raw materials of the biodegradable compositions are rapidly biodegradable materials with short degradation cycles including a disintegration onset of about 7 days on average in soil at ambient temperature and pressure and about 90% disintegration completion after about 180 to about 365 days in ambient conditions.

Among the raw materials for preparing the biodegradable composition, one or more polymers is used as a substrate of the biodegradable composition, preferably to increase the processability of the raw materials of the biodegradable composition. In certain embodiments, the number-average molecular weight of the polymer is from about 5,000 to about 200,000; from about 10,000 to about 150,000; from about 15,000 to about 125,000; from about 25,000 to about 100,000; or from about 50,000 to about 75,000.

In various embodiments, the polymer is polylactic acid, polycaprolactone, polybutylene succinate, polybutylene succinate adipate, polybutylene succinate terephthalate, polybutylene adipate terephthalate, and polyhydroxyalkanoates or combinations thereof. In an optional specific example, the polymer is polybutylene succinate.

In one embodiment, the polymer is a mixture of polylactic acid and polybutylene succinate.

In one embodiment, the polymer is a mixture of polylactic acid and poly(butyleneadipate-co-terephthalate).

In one embodiment, the polymer is a mixture of polybutylene succinate and poly(butyleneadipate-co-terephthalate).

In one embodiment, the polymer is a mixture of polylactic acid, polybutylene succinate and poly(butyleneadipate-co-terephthalate).

In certain embodiments, the polymer in the biodegradable compositions is included in an amount of about 1, 5, 10, 20, 30, 40, 50, 60, 70, 75, 80, 90, or 95 parts by mass (w/w). In certain embodiment, the polymer is included in an amount of about 50 to about 90 parts by mass (w/w). In a particular embodiment, the polymer is present in an amount of about 50 to about 80 parts by mass (w/w).

Among the raw materials for preparing the biodegradable plastic, starch is also used as a substrate of the biodegradable plastics to increase the degradability of bioplastics. Optionally, the starch is at least one selected from the group consisting of corn starch, potato starch and wheat starch. It should be noted that the starch herein is dry starch, weighed on a dry weight basis.

In one embodiment, the starch takes up 1, 5, 10, 20, 30, 35, 40 or 50 parts by mass. Further, the starch takes up 1-40 parts by mass. Even further, the starch takes up 1-30 parts by mass.

In one embodiment, the starch is at least one selected from the group consisting of corn starch, potato starch and wheat starch.

In one embodiment, the coupling agent takes up 1, 1.5, 2, 2.5, 3, 3.5, 4, 4.5 or 5 parts by mass. Further, the coupling agent takes up 1-4 parts by mass. Even further, the coupling agent takes up 1-3 parts by mass.

In one embodiment, the coupling agent is at least one selected from the group consisting of titanate, aluminate, γ-aminopropyltriethoxysilane, γ-(2,3)epoxy (propoxy)propyltrimethoxysilane and γ-methacryloxypropyltrimethoxysilane.

In one embodiment, raw materials for preparing the biodegradable plastic further include, in parts by mass of about 1 to about 15 parts of an inorganic filler where the inorganic filler is glass fiber, calcium carbonate, talc, wollastonite, clay, kaolin, silica (precipitated), carbon black, dolomite, barium sulfate, $Al(OH)_3$, $Mg(OH)_2$, diatomaceous earth, magnetite/hematite, halloysite, zinc oxide, titanium dioxide, aluminum silicate, zirconium oxide, or gypsum.

In one embodiment, the biodegradable composition further includes one or more of additives including, but not limited to, impact modifier in an amount of about 0.1 to about 30% (w/w); chain extender, lubricant, biodegradable stabilizer, toner, and pigment each present in an amount of about 0.1 to about 10% (w/w).

In one embodiment, the toner is at least one selected from the group consisting of fluorescent brightener and titanium dioxide.

In one embodiment, the step of molding the premix includes extruding the premix, where the extrusion is performed at a temperature above ambient temperature, preferably in a range of about 100° C. to about 250° C.

In certain embodiments, the biodegradable compositions of the invention can be used in various embodiments from packaging and single use products to durable products and in a wide range of applications, from packaging to medical, automotive, consumer products, and many more.

A disposable product includes the biodegradable plastic or is prepared by using the method for preparing the biodegradable plastic. In various embodiments, the disposable product is biodegradable and includes, but is not limited to, packaging materials, consumer products (e.g., disposable utensils, cutlery, containers), and industrial materials.

DETAILED DESCRIPTION OF THE INVENTION

To facilitate an understanding of the invention, the invention will be described more comprehensively herein below. However, the invention may be embodied in different forms and is limited to the embodiments set forth herein. Rather, these embodiments are provided for the purpose of making the disclosure of the invention more thorough and comprehensive.

Unless otherwise defined, all technical and scientific terms used herein have the same meaning as those commonly understood by a person skilled in the art to which the present invention belongs. Terms used in the specification of the present invention are only for the purpose of describing specific embodiments, and are not intended to limit the present invention.

Definitions

The term "biobased" refers to compositions that are manufactured from plant materials instead of being made from oil or natural gas. Because they are plant based, there is a tendency to assume that this type of plastic must be biodegradable. However, this is not the case for all plant based compositions. The biobased compositions of the invention can be designed to degrade in less than 6 months.

The terms "biodegradable" or "degradable" are used interchangeably and refer to compositions of the invention that can biodegrade within 12 months in compost environment in a non-toxic, environmentally compatible manner with no heavy metal content, no PTFE content, and remaining soil safe (i.e., lack of ecotoxins). The compositions of the invention biodegrade within 12 months. Plastic that is compostable is biodegradable, but not every plastic that is biodegradable is compostable. The compositions of the invention are both biodegradable and compostable. As used herein, "biodegradable" compositions are engineered to biodegrade in compost, soil or water. In particular, biodegradable plastics are plastics with innovative molecular structures that can be decomposed by bacteria at the end of their life under certain environmental conditions. "Bioplastics" is used to refer to plastics that are bio-based, biodegradable, or fit both criteria. Bio-based plastics of the invention are fully or partly made from renewable feedstock derived from biomass. Commonly used raw materials to produce these renewable feedstock for plastic production include corn stalks, sugarcane stems and cellulose, and increasingly also various oils and fats from renewable sources.

As used herein, "chain extender" refers to materials having terminal active groups (e.g., OH or NH) added to the biodegradable compositions to act as a spacer between one or more monomers to facilitate processing and impart the required properties (e.g., strength or electrical and frictional properties). Also, chain extenders can be used to activate the ending groups of polyesters to initiate the polymerization process so that increases the number of monomers being polymerized and the molecular weight of the polymers.

As used herein, "compostable" compositions refer to biodegradation into soil conditioning material (i.e., compost). In order for a plastic to be labeled as commercially "compostable" it should be broken down by biological treatment at a commercial or industrial composting facility in 180 days or less. Composting utilizes microorganisms, agitation, heat, and humidity to yield carbon dioxide, water, inorganic compounds, and biomass that is similar in characteristic to the rest of the finished compost product. Decomposition of the composition should occur at a rate similar to the other elements of the material being composted (e.g., within 6 months) and leave no toxic residue that would adversely impact the ability of the finished compost to support plant growth. ASTM Standards D6400 and D6868 outline the specifications that must be met in order to label a plastic as commercially "compostable."

As used herein, "impact modifier" refers to any materials to improve the durability and toughness of a biodegradable composition. The amount of impact modifier added depends upon the level of impact resistance needed for end-use applications. The impact modifiers of the invention include any additives for improving appearance, temperature, and strength performance of the biodegradable compositions.

As used herein, "lubricant" means materials that are classified into two categories as internal and external lubricants. Internal lubricants reduce friction between the molecular chains, whereas external lubricants reduce the adherence between polymer melt and metal surfaces. Lubricants also reduce friction between polymer-filler, filler-filler, and filler-metal. Additives that demonstrate mutual effects of internal and external lubrication are known as combined lubricants.

The term "polyesters" refers to polymers of the invention that are obtained, for example, by aliphatic diols, aliphatic dicarboxylic acids, and aromatic dicarboxylic acids/esters. The term polyesters also includes aliphatic aromatic polyesters.

As used herein, "recyclable" means that the composition can be reprocessed at an industrial plant and turned into other useful products. Several types of conventional plastics can be recycled mechanically—the most common type of recycling. Mechanical recycling involves shredding and melting plastic waste and turning it into pellets. These pellets are then used as a raw material to make new products. Plastic quality deteriorates during the process; therefore a piece of plastic can only be mechanically recycled a limited number of times before it is no longer suitable as a raw material. New plastic, or 'virgin plastic', is therefore often mixed with recycled plastic before it is turned into a new product to help reach the desired level of quality. "Chemical recycling" which means plastics are transformed back into building blocks and then processed into virgin-quality raw material for new plastics and chemicals, is a newer family of processes that is now gaining momentum. It typically involves catalysts and/or very high temperatures to break down plastic and can be applied to a wider range of plastic waste compared to mechanical recycling. For example, plastic films containing multiple layers or certain contaminants cannot usually be mechanically recycled but can be chemically recycled.

As used herein, "stabilizers" are additives used to prevent environmental effects (of heat, UV light, etc.) on the polymer and to afford protection against heat (thermal), UV and mechanical degradation of the polymer during both processing and use.

As used herein, "toner" or "pigment" refers to materials added to provide color.

General Embodiments of the Invention

The invention generally encompasses compositions, methods of manufacture, and methods of using biodegradable compositions including, but not limited to, (i) about 10-95% (w/w) of a polymer comprising one or more of biodegradable polyesters; (ii) about 0.1-50 (w/w) of starch; (iii) about 0.1-50 (w/w) of one or more of inorganic filler; and (iv) about 0.1-50 (w/w) of fiber comprising one or more of biomass, wherein the composition exhibits a 90% disintegration completion within about 180 to about 365 days in soil at ambient temperature.

In certain embodiment, the biodegradable compositions further include one or more of additives selected from the group consisting of one or more of: (i) a plasticizer in an amount of from about 0.1 to about 15% (w/w); (ii) a coupling agent in an amount of from about 0.1 to about 10% (w/w); (iii) a compatibilizer in an amount of from about 0.1 to about 10% (w/w); (iv) an impact modifier in an amount of about 0.1 to about 30% (w/w), (v) a chain extender in an amount of about 0.1 to about 10% (w/w), (vi) lubricant in an amount of about 0.1 to about 10% (w/w), (vii) a stabilizer in an amount of about 0.1 to about 10% (w/w), (viii) toner in an amount of about 0.1 to about 10% (w/w), and (ix) pigment in an amount of about 0.1 to about 10% (w/w), or combinations thereof.

In certain embodiments, the compositions exhibit a disintegration onset within 7 days, on average, in soil at ambient temperature.

In certain embodiments, the compositions exhibit a bio-based carbon content of more than 50%.

In certain embodiments, the compositions exhibit a rigidity (represented by 1% secant flexural modulus) of greater than 1000 Mpa.

In certain embodiments, the compositions exhibit a strength (represented by maximum flexural stress) of greater than 30 Mpa.

In certain embodiments, the compositions exhibit an impact strength (represented by notched Izod energy) of more than 30 J/m.

In certain embodiments, the compositions exhibit a MFI (melt flow index or melt flow rate) of greater than 10 g/10 min.

In certain embodiments, the compositions exhibit a MFI (melt flow index or melt flow rate) of less than 10 g/10 min.

In certain embodiments, the compositions include one or more polymers. In embodiments, the one or more polymers is one or more biodegradable polyesters including, but not limited to, polylactic acid, polycaprolactone, polybutylene succinate, polybutylene succinate adipate, polybutylene succinate terephthalate, polybutylene adipate terephthalate, or polyhydroxyalkanoates.

In certain embodiments, the compositions include starch. In certain embodiments, the starch is in native form or modified form including but not limited to thermoplastic starch.

In certain embodiments, the biomass includes, but is not limited to, vinasse, vinegar residues, wood fiber, agricultural cellulosic matter from including straw, stalk, shive, hurd, bast, leaf, seed, fruit, and perennial grass, all in a non-continuous non-woven form including chopped pieces, particulates, dust or flour.

In certain embodiments, the inorganic filler includes, but is not limited to, wollastonite, mica, clay, calcium carbonate, glass fiber, talc, aluminum silicate, zirconium oxide, and gypsum.

In certain embodiments, the plasticizer includes, but is not limited to, glycerin, ethylene glycol, xylitol, vegetable oils (virgin or epoxidized), and natural waxes.

In certain embodiments, the coupling agent or compatibilizer includes, but is not limited to, titanate, aluminate, γ-aminopropyltriethoxysilane, γ-(2,3)epoxy (propoxy)propyltrimethoxysilane and γ-methacryloxypropyltrimethoxysilane.

In certain embodiments, the toner or pigment is at least one selected from the group consisting of fluorescent brightener and titanium dioxide.

In other embodiments, the invention includes methods for preparing the biodegradable composition comprising the following steps plasticizing a starch with the plasticizer; mixing uniformly with other raw materials of the biodegradable composition to prepare a premix; and mixing the premix thoroughly at higher than ambient temperatures to prepare the biodegradable composition.

In other embodiments, the invention encompasses methods for preparing the biodegradable composition comprising the following steps mixing uniformly all materials of the biodegradable composition to prepare a premix, and then mixing the premix thoroughly at higher than ambient temperatures to prepare the biodegradable composition.

In other embodiments, the invention encompasses methods for preparing the biodegradable composition comprising the following steps (a) feeding all materials of the biodegradable composition, individually or premixed with some other materials of the biodegradable composition, simultaneously into a mixer through more than one feeder and (b) mixing all materials of the biodegradable composition thoroughly at higher than ambient temperatures to prepare the biodegradable composition.

In certain embodiments, the method further comprises forming rigid parts using conventional polymer processing techniques comprising injection molding, compression molding, blow molding and extrusion molding.

In certain embodiments, the method further comprises forming thin sheets or films using conventional polymer processing techniques comprising hot press, vacuum forming, cast extrusion, film blowing, or compression molding.

In certain embodiments, the invention encompasses compositions and methods of making a disposable product, comprising the biodegradable composition of the invention, wherein the disposable product is packing material or a consumer product.

Polymers of the Invention

In general, the polymers included in the biodegradable compositions of the invention can be considered valid alternative materials to those produced unsustainably.

The biodegradable polymers of the invention can be derived from natural resources. In certain embodiments the polymers of the invention include biodegradable polyesters.

In certain embodiments, the biodegradable polyester includes, but is not limited to, one or more of polylactic acid, polycaprolactone, polybutylene succinate, polybutylene succinate adipate, polybutylene succinate terephthalate, polybutylene adipate terephthalate, polyhydroxyalkanoates or combinations thereof.

In certain embodiments, the biodegradable polyesters includes polylactic acid and polycaprolactone.

In certain embodiments, the biodegradable polyesters includes polylactic acid and polybutylene succinate.

In certain embodiments, the biodegradable polyesters includes polylactic acid and polybutylene succinate adipate.

In certain embodiments, the biodegradable polyesters includes polylactic acid and polybutylene succinate terephthalate.

In certain embodiments, the biodegradable polyesters includes polylactic acid and polybutylene adipate terephthalate.

In certain embodiments, the biodegradable polyesters includes polylactic acid and polyhydroxyalkanoates.

In certain embodiments, the biodegradable polyesters includes polycaprolactone and polybutylene succinate.

In certain embodiments, the biodegradable polyesters includes polycaprolactone and polybutylene succinate adipate.

In certain embodiments, the biodegradable polyesters includes polycaprolactone and polybutylene succinate terephthalate.

In certain embodiments, the biodegradable polyesters includes polycaprolactone and polybutylene adipate terephthalate.

In certain embodiments, the biodegradable polyesters includes polycaprolactone and polyhydroxyalkanoates.

In certain embodiments, the biodegradable polyesters includes polybutylene succinate and polybutylene succinate adipate.

In certain embodiments, the biodegradable polyesters includes polybutylene succinate and polybutylene succinate terephthalate.

In certain embodiments, the biodegradable polyesters includes polybutylene succinate and polybutylene adipate terephthalate.

In certain embodiments, the biodegradable polyesters includes polybutylene succinate and polyhydroxyalkanoates.

In certain embodiments, the biodegradable polyesters includes polybutylene succinate adipate and polybutylene succinate terephthalate.

In certain embodiments, the biodegradable polyesters includes polybutylene succinate adipate and polybutylene adipate terephthalate.

In certain embodiments, the biodegradable polyesters includes polybutylene succinate adipate and polyhydroxyalkanoates.

In certain embodiments, the biodegradable polyesters includes polybutylene succinate terephthalate and polybutylene adipate terephthalate.

In certain embodiments, the biodegradable polyesters includes polybutylene succinate terephthalate and polyhydroxyalkanoates.

In certain embodiments, the natural biodegradable polymers include those derived from natural raw materials and renewable resources including, but not limited to, as polysaccharides (from starch and cellulose, lignin), proteins (gelatin, casein, wool, silk), and lipids (fats and oil), and can be either naturally or synthetically produced.

In certain embodiments, the polymers of the PHA family include, but are not limited to, those obtained from biologically produced materials or genetically modified bacteria such as poly(hydroxybutyrate), poly(hydroxyvalerate), polyhydroxyhexanoate, and poly(hydroxyalkanoates) (PHAs).

In certain embodiments, the synthetic biodegradable polymers include, but are not limited to, those obtained by chemical polymerization of biomonomers such as PLA, polycaprolactone, polybutylene succinate, polybutylene succinate adipate, aliphatic-aromatic copolyesters, polybutylene adipate/terephthalate, and polymethylene adipate/terephthalate.

In various embodiments, the polymer is present in the compositions of the invention in an amount of from about 0.1% to about 95% (w/w) based on the total composition. In other embodiments, the polymer is present in the compositions of the invention in an amount of from about 5% to about 80% (w/w) based on the total composition. In other embodiments, the polymer is present in the compositions of the invention in an amount of from about 10% to about 70% (w/w) based on the total composition. In other embodiments, the polymer is present in the compositions of the invention in an amount of from about 20% to about 60% (w/w) based on the total composition. In other embodiments, the polymer is present in the compositions of the invention in an amount of from about 30% to about 50% (w/w) based on the total composition. In other embodiments, the polymer is present in the compositions of the invention in an amount of from about 40% to about 45% (w/w) based on the total composition. In certain embodiments, the amount of polymer is about 0.1, 0.5, 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95% (w/w).

Starch of the Invention

In various embodiments, the biodegradable compositions of the invention include a starch. In certain embodiments, the starch component of the biodegradable composition can include any known starch material, including one or more unmodified starches, modified starches, and starch derivatives. Preferred starches can include any unmodified starch that is initially in a native state as a granular solid and which will form a thermoplastic melt by mixing and heating. In certain embodiments, starch includes a natural carbohydrate chain comprising polymerized glucose molecules in an alpha-(1,4) linkage and is found in nature in the form of granules. Starches used in compositions of the invention include the following properties: the ability to maintain structure in the presence of many types of other materials; and the ability to melt into plastic-like materials at low temperatures, for example, between about 0 to about 75° C., preferably between about 0 and about 65° C., and in the presence of a wide range of materials and in moist environments and to exhibit high binding strengths and produce an open cell structure. In certain embodiments, sources of starch include, for example, cereal grains (e.g., corn, waxy corn, wheat, sorghum, rice, and waxy rice, which can also be used in the flour and cracked state), tubers (potato), roots (tapioca (i.e., cassava and maniac), sweet potato, and arrowroot), modified corn starch, and the pith of the sago palm.

In various embodiments, the starch is present in the compositions of the invention in an amount of from about 0.1% to about 50% (w/w) based on the total composition. In various embodiments, the starch is present in the compositions of the invention in an amount of from about 1% to about 45% (w/w) based on the total composition. In other embodiments, the starch is present in the compositions of the invention in an amount of from about 5% to about 40% (w/w) based on the total composition. In other embodiments, the starch is present in the compositions of the invention in an amount of from about 10% to about 30% (w/w) based on the total composition. In other embodiments, the starch is present in the compositions of the invention in an amount of from about 15% to about 20% (w/w) based on the total composition. In certain embodiments, the amount of starch is about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% (w/w).

Preferred starch-based binders are those that produce a high viscosity at a relatively low temperature. For example, potato starch reaches a maximum viscosity at about 65° C. The viscosity then decreases, reaching a minimum at about 95° C. Wheat starch acts in a similar fashion and can also be used. Such starch-based binders are valuable in producing thin-walled articles having a smooth surface and a skin with sufficient thickness and density to impart the desired mechanical properties.

In general, starch granules are insoluble in cold water. It is possible to reduce the amount of water in starch melts by replacing the water inherently found in starch with an appropriate low volatile plasticizer capable of causing starch to melt below its decomposition temperature, such as glycerin, polyalkylene oxides, mono- and diacetates of glycerin, sorbitol, other sugar alcohols, and citrates. This can allow for improved processability, greater mechanical strength, better dimensional stability over time, and greater ease in blending the starch melt with other polymers.

Suitable starches can also be selected from the following: ahipa, apio (arracacha), arrowhead (arrowroot, Chinese potato, jicama), baddo, bitter casava, Brazilian arrowroot, casava (yucca), Chinese artichoke (crosne), Japanese artichoke (chorogi), Chinese water chestnut, coco, cocoyam, dasheen, eddo, elephant's ear, girasole, goo, Japanese potato, Jerusalem artichoke (sunroot, girasole), lily root, ling gaw, malanga (tanier), plantain, sweet potato, mandioca, manioc, Mexican potato, Mexican yarn bean, old cocoyam, saa got, sato-imo, seegoo, sunchoke, sunroot, sweet casava, tanier, tannia, tannier, tapioca root, taro, topinambour, water chestnut, water lily root, yam bean, yam, yautia, barley, corn, sorghum, rice, wheat, oats, buckwheat, rye, kamut brand wheat, triticale, spelt, amaranth, black quinoa, hie, millet, plantago seed husks, psyllium seed husks, quinoa flakes, quinoa, teff.

Starches that can be used for the present invention include unmodified starches (armylose and amylopectin) and modified starches. By modified, it is meant that the starch can be derivatized or modified from its native form by typical processes known in the art including, physical, biological, or chemical processes such as, for example, plasticization, esterification, etherification, oxidation, acid hydrolysis, cross-linking, and enzyme conversion. Typical modified starches include esters, such as the acetate and, the half-esters of dicarboxylic acids/anhydrides, particularly the alkenyl succinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. The invention also encompasses modified starch prepared by physically, enzymatically, or chemically treating native starch to change its properties. Modified starches are used in practically all starch applications, such as in food products as a thickening agent, stabilizer or emulsifier; in pharmaceuticals as a disintegrant; or as binder in coated paper. They are also used in many other applications. Starches are modified to enhance their performance in different applications. Starches may be modified to increase their stability against excessive heat, acid, shear, time, cooling, or freezing; to change their texture; to decrease or increase their viscosity; to lengthen or shorten gelatinization time; or to increase their visco-stability. Modified starches also include seagel, long-chain alkylstarches, dextrins, amine starches, and dialdehyde starches. In other embodiments, the starches also include compositions based on plasticized starch, the so-called "thermoplastic starch." These mutiphase materials are obtained when combining plasticized starches and other biodegradable materials, such as biodegradable polyesters [polycaprolactone (PCL), polyhydroxyalkanoates (PHAs), polylactic acid (PLA), polyesteramide (PEA), aliphatic, and aromatic copolyesters, or agro-materials (ligno-cellulosic fiber, lignin etc.). Depending on materials (soft, rigid) and the plastic processing system used, various structures (blends, composites, multilayers) can be obtained.

Fibers of the Invention

In the present invention, additional fibers can be employed as part of the compositions of the invention. The fibers used are preferably organic, and most preferably cellulose-based materials, which are chemically similar to starches in that they comprise polymerized glucose molecules. "Cellulosic fibers" refers to fibers of any type which contain cellulose or consist of cellulose. Plant fibers preferred here are those of differing lengths typically in the range from 600 micron to 3000 micron, principally from hemp, cotton, plant leaves, sisal, abaca, bagasse, wood (both hard wood or soft wood, examples of which include southern hardwood and southern pine, respectively), or stems, or inorganic fibers made from glass, graphite, silica, ceramic, or metal materials. The cellulosic fibers include wood fibers and wood flour.

Among the raw materials for preparing the biodegradable compositions, the fiber is used as a toughener to increase material toughness and reduce costs. Specifically, the fiber is at least one selected from the group consisting of vinasse, vinegar residue, wood flour and straw. Optionally, the vinasse is at least one selected from the group consisting of beer vinasse and whole grain vinasse. Straw is a generic term for stems and leaves (ears) of ripe crops, and refers to the remaining parts of wheat, rice, maize, potatoes, oilseed rape, cotton, sugarcane and other crops (usually coarse grains) after seeds are harvested. Optionally, the straw is selected from the group consisting of hemp straw, corn straw, wheat straw or rice straw.

In one embodiment, the fiber included in present in an amount of about 1, 5, 10, 15, 20, 25 or 30, 35, 40, 45, or 50 parts by mass. In various embodiments, the fiber is present in the compositions of the invention in an amount of from about 0.1% to about 50% (w/w) based on the total composition. In other embodiments, the fiber is present in the compositions of the invention in an amount of from about 1% to about 45% (w/w) based on the total composition. In other embodiments, the fiber is present in the compositions of the invention in an amount of from about 5% to about 40% (w/w) based on the total composition. In other embodiments, the fiber is present in the compositions of the invention in an amount of from about 10% to about 35% (w/w) based on the total composition. In other embodiments, the fiber is present in the compositions of the invention in an amount of from about 15% to about 30% (w/w) based on the total composition. In other embodiments, the fiber is present in the compositions of the invention in an amount of from about 20% to about 25% (w/w) based on the total composition. In certain embodiments, the amount of fiber is about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% (w/w).

Larger particles are considered to be fibers. The expression "fibers" refers to fine, thin objects restricted in their length, the length being greater than the width. They can be present as individual fibers or as fiber bundles. Such fibers can be produced in a manner known to those skilled in the art. Preferred fibers have a low length to diameter ratio and produce materials of excellent strength and light weight. In general, the fibers used in the invention will have an aspect ratio of about between 1:2 and 1:10; 1:2 and 1:9; 1:2 and 1:8; 1:2 and 1:7; 1:2 and 1:6; 1:2 and 1:5; 1:2 and 1:4; 1:2 and 1:3; 1:2 and 1:2; or 1:2 and 1:9.9.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture.

Inorganic Fillers of the Invention

In various embodiments, the biodegradable compositions of the invention include an inorganic filler.

In various embodiments, the inorganic filler is present in the compositions of the invention in an amount of from about 0.1% to about 50% (w/w) based on the total composition. In various embodiments, the inorganic filler is present in the compositions of the invention in an amount of from about 1% to about 45% (w/w) based on the total composition. In other embodiments, the inorganic filler is present in the compositions of the invention in an amount of from about 5% to about 40% (w/w) based on the total composition. In other embodiments, the inorganic filler is present in the compositions of the invention in an amount of from about 10% to about 30% (w/w) based on the total composition. In other embodiments, the inorganic filler is present in the compositions of the invention in an amount of from about 15% to about 20% (w/w) based on the total composition. In certain embodiments, the amount of inorganic filler is about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% (w/w).

In certain embodiments, the inorganic filler (e.g., fibers and/or particles).

Exemplary inorganic fillers include quartz, glass beads, glass bubbles and glass fibers; silicates such as talc, clays, (montmorillonite) feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite. In some embodiments, the filler comprises an inorganic filler having a density of at least 2 grams per cubic centimeter.

Additional Materials

In addition to the polymer, starch, fiber, and inorganic filler, the biodegradable compositions can optionally also include one or more additional materials depending on desired characteristics of the final product.

The biodegradable compositions of the invention optionally include a plasticizer. The plasticizer (when used) can facilitate in rendering the water-soluble polymer melt-processible. The plasticizer content in the compositions of the invention (when optionally used) is generally about 0.1% to about 15% (and all values and ranges therebetween), typically about 2% to about 10%, more typically 5% to about 7%. In various embodiments, the plasticizer is included in the composition in an amount of about 0.1% to about 15% (w/w) based on the total composition. In certain embodiments, when included in the compositions, the plasticizer is present in an amount of about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 11%, 12%, 13%, 14%, or 15% by weight of the composition.

Among the materials for preparing the biodegradable plastic, the optional plasticizer can be used in certain embodiments to plasticize the starch. Optionally, the plasticizer is at least one selected from the group consisting of glycerin, ethylene glycol and xylitol. It should be understood that in other embodiments, the plasticizer is not limited to the above plasticizer, but may also be other substances capable of acting as plasticizers for starch.

In one embodiment, the plasticizer is at least one selected from the group consisting of glycerin, ethylene glycol and xylitol.

In one embodiment, the plasticizer includes about 1, 3, 5, 8, 10, 12 or 15 parts by mass. Further, the plasticizer includes about 1-12 parts by mass. Even further, the plasticizer includes about 1-10 parts by mass.

Suitable plasticizers include, but are not limited to, polyhydric alcohol plasticizers, such as, but not limited to, sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), manganese chloride tetrahydrate, magnesium chloride hexahydrate etc. Other suitable plasticizers are hydrogen bond-forming organic compounds which do not have hydroxyl group, including, but not limited to, urea and urea derivatives; anhydrides of sugar alcohols such as, but not limited to, sorbitan; animal proteins such as, but not limited to, gelatin; vegetable proteins such as, but not limited to, sunflower protein, soybean proteins, cotton seed proteins; and mixtures thereof. Other suitable plasticizers can include organic acids, phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids can also be used, such as, but not limited to, copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is typically selected, such as less than about 20,000 g/mol, typically less than about 5,000 g/mol and more typically less than about 1,000 g/mol.

Through selective control over the nature of the composition (e.g., molecular weight, viscosity, etc.), the nature of the plasticizer, and the relative amounts of the plasticizer, in some embodiment, the resulting plasticized biodegradable polymer can achieve a melt viscosity that is similar to that of the elastomer, which further helps minimize phase separation during formation of the materials.

In one non-limiting embodiment, the ratio of the melt viscosity of the elastomer to the plasticized polymer is about 1 to about 90 (and all values and ranges therebetween), in some embodiments about 1 to about 40, and in some embodiments about 1 to about 3. For example, the plasticized water-soluble polymer can have an apparent melt viscosity of about 10 to about 400 Pascal seconds (Pas) (and all values and ranges therebetween), in some embodiments about 20 to about 200 Pas, and in some embodiments about 30 to about 80 Pas, as determined at a temperature of 195° C. and a shear rate of 1000 sec$^{-1}$. Likewise, the apparent melt viscosity of the elastomer can be about 20 to about 500 Pascal seconds (Pas) (and all values and ranges therebetween), in some embodiments about 30 to about 200 Pas, and in some embodiments about 40 to about 100 Pas, as determined at a temperature of 195° C. and a shear rate of 1000 sec$^{-1}$.

The plasticizer can be optionally added to form a single phase in the binder or interfacial phase between the polymer and the elastomer.

In some embodiments, the biodegradable compositions of the invention optionally include a coupling agent. Without being limited by theory, when included in the compositions of the invention, it is believed that the interaction of the plasticizer with one or more of the other components gives the thermoplastic compositions of the present invention the advantageous properties.

The expression "coupling agent" is understood within the invention to mean any molecule bearing at least two free or masked functional groups capable of reacting with molecules bearing functional groups having an active hydrogen such as starch or the plasticizer of the starch. As explained above, this coupling agent enables the attachment, via covalent bonds, of at least one part of the plasticizer to the starch and/or to the non-starchy polymer. The coupling agent therefore differs from adhesion agents, physical compatibilizing agents or grafting agents, described in the prior art, by the fact that the latter either only create weak bonds (non-covalent bonds), or only bear a single reactive functional group.

In certain embodiments, the molecular weight of the coupling agent used in the present invention is less than 5000 and preferably less than 1000. Indeed, the low molecular weight of the coupling agent favors its rapid diffusion into the plasticized starch composition.

Preferably, said coupling agent has a molecular weight between 50 and 500, in particular between 90 and 300.

The coupling agent may be chosen, for example, from compounds bearing at least two identical or different, free or masked, functional groups, chosen from isocyanate, carbamoylcaprolactam, epoxide, halogen, protonic acid, acid anhydride, acyl halide, oxychloride, trimetaphosphate, and alkoxysilane functional groups and combinations thereof.

In certain embodiment, the coupling agent may be selected from one or more of the following compounds: diisocyanates and polyisocyanates, preferably 4,4-dicyclohexylmethane diisocyanate (H12MDI), methylene diphenyl diisocyanate (MDI), toluene diisocyanate (TDI), naphthalene diisocyanate (NDI), hexamethylene diisocyanate (HMDI) and lysine diisocyanate (LDI); dicarbamoylcaprolactams, preferably 1,1?-carbonylbiscaprolactam; diepoxides; halohydrins, compounds comprising an epoxide functional group and a halogen functional group, preferably epichlorohydrin; organic diacids, preferably succinic acid, adipic acid, glutaric acid, oxalic acid, malonic acid, maleic acid and the corresponding anhydrides; oxychlorides, preferably phosphorus oxychloride; trimetaphosphates, preferably sodium trimetaphosphate; alkoxysilanes, preferably tetraethoxysilane, and any mixtures of these compounds.

In one preferred embodiment of the present invention, the coupling agent is chosen from organic diacids and compounds bearing at least two identical or different, free or masked functional groups chosen from isocyanate, carbamoylcaprolactam, epoxide, halogen, acid anhydride, acyl halide, oxychloride, trimetaphosphate and alkoxysilane functional groups.

In one preferred embodiment of the method of the invention, the coupling agent is chosen from diepoxides, diisocyanates and halohydrins. In particular, it is preferred to use a coupling agent chosen from diisocyanates, methylene diphenyl diisocyanate (MDI) and 4,4-dicyclohexylmethane diisocyanate (H12MDI) being particularly preferred.

The amount of coupling agent, expressed as dry matter and related to the sum of the composition is between 0.1 and 10% by weight, preferably between 0.5 and 8% by weight, better still between 1 and 5% by weight and in particular between 2 and 4% by weight. In certain embodiments, the amount of coupling agent is about 0.1, 0.5, 1, 2, 3, 4, 5, 6, 7, 8, 9, or 10% (w/w). By way of example, this amount of coupling agent may be between 0.5 and 3% by weight.

Optionally the compositions of the invention include one or more compatibilizers. One or more compatibilizers can also be used in the material to further enhance the compatibility between the elastomeric phase and the polymer in the compositions.

When used, the amount of compatibilizer, expressed as dry matter and related to the sum of the composition is between 0.1 and 10% by weight, preferably between 0.5 and 8% by weight, better still between 1 and 5% by weight and in particular between 2 and 4% by weight. In certain embodiments, the amount of compatibilizer is about 0.1, 0.5, 1, 2, 3, 4, 5, 6, 7, 8, 9, or 10% (w/w).

Non-limiting examples of compatibilizers include both homopolymers and copolymers, i.e., polyethylene, ethylene copolymers such as, but not limited to, polypropylene, propylene copolymers, and polymethylpentene polymers. An olefin copolymer can include a minor amount of non-olefinic monomers, such as, but not limited to, styrene, vinyl acetate, diene, or acrylic and non-acrylic monomer.

Non-limiting examples of compounds containing functional groups acting as compatabilizers include, but are not limited to, aliphatic carboxylic acids; aromatic carboxylic acids; esters; acid anhydrides and acid amides of these acids; imides derived from these acids and/or acid anhydrides; aliphatic glycols or phenols; isocyanates, such as, but not limited to, toluene diisocyanate and methylenebis-(4-phenyl isocyanate); oxazolines, such as, but not limited to, 2-vinyl-2-oxazoline; epoxy compounds, such as, but not limited to, epichlorohydrin and glycidyl methacrylate; aliphatic amines (e.g., monoamines, diamines, amines, or tetramines); aromatic amines, such as, but not limited to, m-phenylenediamine; and so forth. Particularly suitable functional groups are maleic anhydride, maleic acid, fumaric acid, maleimide, maleic acid hydrazide, a reaction product of maleic anhydride and diamine, methyl nadic anhydride, dichloromaleic anhydride, and maleic acid amide.

Maleic anhydride-modified polyolefins are particularly suitable for use in compatabilizing olefinic elastomers and water soluble binders. Such modified polyolefins are typically formed by grafting maleic anhydride onto a polymeric backbone material. Such maleated polyolefins are available from E. I. du Pont de Nemours and Company under the designation Fusabond® such as, but not limited to, the P Series (chemically-modified polypropylene), E Series (chemically-modified polyethylene), C Series (chemically-modified ethylene vinyl acetate), A Series (chemically-modified ethylene acrylate copolymers or terpolymers), or N Series (chemically-modified ethylene-propylene, ethylene-propylene diene monomer (EPDM) or ethylene-octene). Alternatively, maleated polyolefins are also available from Chemtura Corp. under the designation Polybond®. and Eastman Chemical Company under the designation Eastman G series.

In addition, further cellulose-based thickening agents can be added, which can include a wide variety of cellulosic ethers, such as methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, and the like. Other natural polysaccharide-based thickening agents include, for example, alginic acid; phycocolloids, agar, gum arabic, guar gum, locust bean gum, gum karaya, xanthan gum, and gum tragacanth. Suitable protein-based thickening agents include, for example, ZEIN® (a prolamine derived from corn), collagen (derivatives extracted from animal connective tissue such as gelatin and glue), and casein (derived from cow's milk). Suitable synthetic organic thickening agents include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex. Latex is a broad category that includes a variety of polymerizable substances formed in a water emulsion. An example is styrene-butadiene copolymer. Additional copolymers include: vinyl acetate, acrylate copolymers, butadiene copolymers with styrene and acetonitrile, methylacrylates, vinyl chloride, acrylamide, fluorinated ethylenes. Hydrophilic monomers can be selected from the following group: N-(2-hydroxypropyl)methacryl-amide, N-isopropyl acrylamide, N,N-diethylacryl-amide, N-ethylmnethacrylamide, 2-hydroxyethyl methacrylate, acrylic acid 2-(2-hydroxyethoxy) ethyl methacrylate, methacrylic acid, and others, and can be used for the preparation of hydrolytically biodegradable polymeric gels. Suitable hydrophobic monomers can be selected from the 2-acetoxyethyl methacrylate group of monomers comprising dimethylaminoethyl methacrylate, n-butyl methacrylate, tert-butylacrylamide, n-butyl acrylate, methyl methacrylate, and hexyl acrylate. The polymerization can be carried out in solvents, e.g. in dimethylsulfoxide, dimethylformamide, water, alcohols as methanol and ethanol, using common initiators of the radical polymerization.

Other copolymers include: aliphatic polyesters, poly-caprolactone, poly-3-hydroxybutyric acid, poly-3-hydroxy-valeric acid, polyglycolic acid, copolymers of glycolic acid and lactic acid, and polylactide, PVS, SAN, ABS, phenoxy, polycarbonate, nitrocellulose, polyvinylidene chloride, a styrene/allyl alcohol copolymer, polyethylene, polypropylene, natural rubber, a sytrene/butadiene elastomer and block copolymer, polyvinylacetate, polybutadiene, ethylene/propylene rubber, starch, and thermoplastic segmented polyurethane, homopolymers on copolymers of polyesters, polyorthoesters, polylactides, polyglycolides, polycaprolactones, polyhydroxybutyrates, polyhydroxyvalerates, porno acids, pseudopolyamino acids, polyamides and polyanhydrides, homopolymers and copolymers of polylactic acid, polyglygyolic acid, polycaprolactone (PCL), polyanhydrides, polyorthoesters, polyaminoacids, pseudopolyaminoacids, polyhydroxybutyrates, polyhydroxyvalerates, polyphophazenes, and polyalkylcyanoacrylates.

Additional polymers that can be added include: citrates, diethyl citrate (DEC), triethyl citrate (TEC), acetyl triethyl citrate (ATEC), tributyl citrate (TBC), acetyl tributyl citrate (ATBC), phthalates such as dimethyl phthalate (DMP), diethyl phthalate (DEP), triethyl phthalate (TEP), dibutyl phthalate (DBP), dioctyl phthalate, glycol ethers such as ethylene glycol diethyl ether, propylene glycol monomethyl ether, ethylene glycol monoethyl ether, diethylene glycol monoethyl ether (Transcutol™), propylene glycol monotertiary butyl ether, dipropylene glycol monomethyl ether, n-methylpyrrolidone, 2 pyrrolidone (2-Pyrrol™), propylene glycol, glycerol, glyceryl dioleate, ethyl oleate, benzylbenzoate, glycofurol sorbitol sucrose acetate isobutyrate, butyryl-tri-n-hexyl-citrate, acetyl-tri-n-hexyl citrate, sebacates such as dibutyl sebacate, tributyl sebacate, dipropylene glycol methyl ether acetate (DPM acetate), propylene carbonate, propylene glycol laurate, propylene glycol caprylate/caprate, caprylic/capric triglyceride, gamma butyrolactone, polyethylene glycols (PEG), glycerol and PEG esters of acids and fatty acids (Gelucires™, Labrafils™, and Labrasol™) such as PEG-6 glycerol mono oleate, PEG-6 glycerol linoleate, PEG-8 glycerol linoleate, PEG-4 glyceryl caprylatecaprate, PEG-8 glyceryl caprylate/caprate, polyglyceryl-3-oleate, polyglyceryl-6-dioleate, polyglyceryl-3-isostearate, PEG-32 glyceryl laurate (Gelucire 44/1™), PEG-32 glyceryl palmitostearate (Gelucire 50/13™), PEG-32 glyceryl stearate (Gelucire 53/10™), glyceryl behenate, cetyl palmitate, glyceryl di and tri stearate, glyceryl palmitostearate, and glyceryl triacetate (Triacetin™), vegetable oils obtained from seeds, flowers, fruits, leaves, stem or any part of a plant or tree including cotton seed oil, soy bean oil almond oil, sunflower oil, peanut oil, sesame oil. The use of two or more plasticizers in a combination or blend of varying ratios and hydrophilicity or hydrophobicity is also encompassed by the present invention. Plasticizers also include: phthalates, glycol ethers, n-methylpyrrolidone, 2 pyrrolidone, propylene glycol, glycerol, glyceryl dioleate, ethyl oleate, benzylbenzoate, glycofurol sorbitol, sucrose acetate isobutyrate, butyryltri-n-hexyl-citrate, acetyltri-n-hexyl citrate, sebacates, dipropylene glycol methyl ether acetate (DPM acetate), propylene, carbonate, propylene glycol laurate, propylene glycol caprylate/caprate, caprylic/capric triglyceride, gamma butyrolactone, polyethylene glycols (PECs), vegetable oils obtained from seeds, flowers, fruits leaves, stem or any part of a plant or tree including cotton seed oil, soy bean oil, almond oil, sunflower oil peanut oil, sesame oil, glycerol and PEG esters of acids and fatty acids, polyglyceryl-3-oleate, polyglyceryl-6-dioleate, polyglyceryl-3-isostearate, PEG-32 glyceryl laurate, PEG-32 glyceryl palmitostearate, PEG-32 glyceryl stearate, glyceryl behenate, cetyl palmitate, glyceryl di and tri stearate, glyceryl palmitostearate, and glyceryl triacetate. These materials can also be added in combination with other polymers to improve flexibility.

The addition of these items may increase the efficiency of production of the product on an item basis. Baking powder and other materials, such as leavening agents, which release gases, (e.g., sodium or calcium bicarbonates or carbonates) can be included in the compositions of the invention to elevate the number of open cells in the final structure by introducing a source of carbon dioxide gas, which is released in the mold.

Glycerol, microcrystalline wax, fatty alcohols and other similar organic molecules can be added as a mold release agent, and to produce a smoother surface on the finished product. Examples of agents that can be added, either as plasticizers or as mold releasing agents are ethylene glycol, propylene glycol, glycerin, 1,3-propanediol, 1,2-butandiol, 1,3-butandiol, 1,4-butanediol, 1,5-pentandiol, 1,5-hexandiol, 1,6-hexandiol, 1,2,6-hexantriol, 1,3,5-hexantriol, neopentylglycol, sorbitol acetate, sorbitol diacetate, sorbitol monoethoxylate, sorbitol diethoxylate, sorbitol hexaethoxylate, sorbitol dipropoxylate, arrunosorbitol, trihydroxymethylaminomethane, glucose/PEG, the reaction product of ethylene oxide with glucose, trimethylolpropane monoethoxylate, mannitol monoacetate, mannitol monoethoxylate, butyl glucoside, glucose monoethoxylate, a-methyl glucoside, the sodium salt of carboxymethylsorbitol, polyglycerol monoethoxylate, erythritol, pentaerythritol, arabitol, adonitol, xylitol, mannitol, iditol, galactitl, ailitol, sorbitol, polyhydric alcohols generally, esters of glycerin, formamide, N-methylformamide, DMSO, mono- and diglycerides, alkylarruides, polyols, trimethylolpropane, polyvinylalcohol with from 3 to 20 repeating units, polyglycerols with from 2 to 10 repeating units, and derivatives of the foregoing. Examples of derivatives include ethers, thioethers, inorganic and organic esters, acetals, oxidation products, amides, and amines. These agents can be added from 0-10%, preferably 3-4% (w/w). A consideration of the inventive mixture should be that the composition preferably contains at least 75%, more preferably at least 95% of natural or organic-derived materials by weight of the homogenous moldable composition.

Coatings for Molded Articles

Before, during, or after any of the molding processes, coatings can be applied to the surface of a substantially dried article for any desired purpose, such as to make the article more waterproof, grease and food product proof, more flexible, or to give it a glossier surface. Coatings can be used to alter the surface characteristics including sealing and protecting the article made therefrom. Coatings can provide protection against moisture, base, acid, grease, and organic solvents. They can provide a smoother, glossier, or scuff-resistant surface, they can help reinforce the article and coatings can also provide reflective, electrically conductive or insulative properties.

Water resistance can be achieved through the use of a water resistant layer applied on one or both sides of the product. There are many currently available coatings that can be used to coat this product. Some of these are: PROTECOAT® 6616B by New Coat, Inc.; ZEIN® a biodegradable material isolated from corn; bacterial cellulose; chitosan based polymers from shell fish wastes; natural waxes and oil based coatings.

Appropriate organic coatings include edible oils, melamine, polyvinyl chloride, polyvinyl alcohol, polyvinyl acetate, polyacrylates, polyamides, hydroxypropylmethylcellulose, polyethylene glycol, acrylics, polyurethane, polyethylene, polylactic acid, Biopol™ (a polyhydroxybutyrate-hydroxyvalerate copolymer), starches, soybean protein, polyethylene, and synthetic polymers including biodegradable polymers, waxes (such as beeswax or petroleum based wax), elastomers, edible oils, fatty alcohols, phospholipids and other high molecular weight biochemicals, and mixtures or derivatives thereof. Biopol® is manufactured by ICI in the United Kingdom. Elastomer, plastic, or paper coatings can aid in preserving the integrity of the article. Appropriate inorganic coatings include sodium silicate, calcium carbonate, aluminum oxide, silicon oxide, kaolin, clay, ceramic and mixtures thereof. The inorganic coatings can also be mixed with one or more of the organic coatings set forth above. Coatings based upon materials such as soybean oil or Methocel® (available from Dow Chemical), either alone or in combination with polyethylene glycol, can be applied to the surface in order to permanently soften the article or a hinge area within the article.

The coating can be applied either during the forming process or after the article is formed. The coating can be formed during the forming process by adding a coating material that has approximately the same melting temperature as the peak temperature of the mixture. As the mixture is heated, the coating material melts and moves with the vaporized solvent to the surface of the article where it coats the surface.

The coatings can be applied to the shaped articles using any coating means known in the art of manufacturing paper, paperboard plastic, polystyrene, sheet metal, or other packaging materials, including blade, puddle, air-knife, printing, Dahlgren, gravure, and powder coating, Coatings can also be applied by spraying the article with any of the coating materials listed below or by dipping the article into a vat containing an appropriate coating material. These materials can be applied either as a thin film or can be sprayed/dipped onto the product. The apparatus used for coating will depend on the shape of the article. For example, cups will usually be coated differently than flat plates. Bonding processes for application of thin films of water-resistant material are known in the art. Each of these coatings are biodegradable and should not significantly impact the compostability of the product. The second method of improving the water resistance of the product is to add one or more biodegradable materials to the material either before molding or as part of the molding process. In each of these cases the basic composition of the product will remain fairly constant.

A waterproof coating is desirable for articles intended to be in contact with water.

As the articles having a starch-based binder have a high affinity for water, the preferred coatings are non-aqueous and have a low polarity. Appropriate coatings include paraffin (synthetic wax); shellac; xylene-formaldehyde resins condensed with 4,4'-isopropylidenediphenolepichlorohydrin epoxy resins; drying oils; reconstituted oils from triglycerides or fatty acids from the drying oils to form esters with various glycols (butylene gylcol, ethylene glycol), sorbitol, and trimethylol ethane or propane; synthetic drying oils including polybutadiene resin; natural fossil resins including copal (tropical tree resins, fossil and modern), damar, elemi, gilsonite (a black, shiny asphaltite, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); phenolic resins formed by reaction of phenols with formaldehyde; polyester resins; epoxy resins, catalysts, and adjuncts; coumrarone-indene resin; petroleum hydrocarbon resin (cyclopentadiene type); terpene resins; urea-formaldehyde resins and their curing catalyst; triazine-formaldehyde resins and their curing catalyst; modifiers (for oils and alkyds, including polyesters); vinyl resinous substances (polyvinyl chloride, polyvinyl acetate, polyvinyl alcohol, etc.); cellulosic materials (carboxymethylcellulose, cellulose acetate, etlhhydroxyethylcellulose, etc.); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid; Biopol® (a polyhydroxybutyrate-hydroxyvalerate copolymer); soybean protein; other synthetic polymers including biodegradable polymers; and elastomers and mixtures thereof. Biopol® is manufactured by ICI in the United Kingdom. Appropriate inorganic coatings include sodium silicate, calcium carbonate, aluminum oxide, silicon oxide, kaolin, day, ceramic and mixtures thereof. The inorganic coatings can also be mixed with one or more of the organic coatings set forth above.

If the articles are used as containers or for other products intended to come into contact with foodstuffs, the coating material will preferably include an FDA-approved coating. An example of a particularly useful coating is sodium silicate, which is acid resistant. Resistance to acidity is important, for example, where the article is a container exposed to foods or drinks having a high acid content, such as soft drinks or juices. It is generally unnecessary to protect the article from basic substances, but increased resistance to basic substances can be provided by an appropriate polymer or wax coating, such as those used to coat paper containers.

Polymeric coatings, such as polyethylene, are useful in forming generally thin layers having low density. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. The coatings can be applied to the article by any means known in the art, including the use of a high energy electron beam evaporation process, chemical plasma deposition and sputtering. Another method of forming an aluminum oxide or silicon oxide coating involves treating the article with an aqueous solution having an appropriate pH level to cause the formation of aluminum oxide or silicon oxide on the article due to the composition of the article.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

In some cases, it can be preferable for the coating to be elastomeric or deformable. Some coatings can also be used to strengthen places where the articles are severely bent. In such cases, a pliable, possibly elastomeric, coating can be preferred.

Of course, it should be understood that the starch compositions of the present invention can themselves be used as coating materials in order to form a synergistic composite with, or otherwise improve the properties of, any number of other materials. Such disparate materials such as paper, paperboard, molded starch-bound articles such as starch-based foams, metals, plastics, concrete, plaster, ceramics, and the like can be coated with starch composition.

It can be desirable to apply print or other indicia, such as trademarks, product information, container specifications, or logos, on the surface of the article. This can be accomplished using any conventional printing means or processes known in the art of printing paper or cardboard products, including planographic, relief, intaglio, porous, and impactless printing. Conventional printers include offset, Van Dam, laser, direct transfer contact, and thermographic printers. However, essentially any manual or mechanical means can be used.

Biodegradable Compositions of the Invention

In some embodiments, raw materials for preparing the biodegradable plastic include, in parts by mass, about 0.1 to about 95 parts of polymer, about 0.1 to about 50 parts of fiber, about 0.1 to 50 parts of starch, and 0.1 to 50 parts of an inorganic filler. Optionally the compositions can include 0.1 to 15 parts of plasticizer and 0.1 to 5 parts of coupling agent.

It has been proven that with the combination of the polymer, the fiber, the starch, and the inorganic filler, the degradation cycle can be shortened while the mechanical properties (tensile strength and toughness) of the biodegradable plastic are improved.

In various embodiments, the compositions of the invention are biodegradable. The term biodegradable is a relative term as used herein and one of ordinary skill will understand that the biodegradability will depend on the type and amount of each component of the composition as well as the natural conditions under which the article is disposed. The biodegradable compositions are also compostable. As used herein the term, "biodegradable" means that the articles formed using the compositions of the invention will biodegrade under composting conditions preferably less than 10 years, less than 5 years, less than 1 year, less than 6 months, less than 1 month, less than 1 week after disposal. In particular embodiments, the articles "degrade in less than about 10, 9, 8, 7, 6, 5, 4, 3, 2, or 1 years. In other embodiments, the articles "degrade in less than about 12, 11, 10, 9, 8, 7, 6, 5, 4, 3, 2, or 1 months. In other embodiments, the articles "degrade in less than about 4, 3, 2, or 1 weeks. In other embodiments, the articles "degrade in less than about 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 days. In other embodiments, the terms biodegradable includes compositions that are at least 1% degraded in about 1 year, preferably about 10% degraded in about 1 year, preferably about 20% degraded in about 1 year, preferably about 30% degraded in about 1 year, preferably about 40% degraded in about 1 year, preferably about 50% degraded in about 1 year, preferably about 60% degraded in about 1 year, preferably about 70% degraded in about 1 year, preferably about 80% degraded in about 1 year, preferably about 90% degraded in about 1 year, preferably about 99% degraded in about 1 year, or preferably about 99.99% degraded in about 1 year. In other embodiments, the terms biodegradable includes compositions that are at least 1% degraded in about 6 months, preferably about 10% degraded in about 6 months, preferably about 20% degraded in about 6 months, preferably about 30% degraded in about 6 months, preferably about 40% degraded in about 6 months, preferably about 50% degraded in about 6 months, preferably about 60% degraded in about 6 months, preferably about 70% degraded in about 6 months, preferably about 80% degraded in about 6 months, preferably about 90% degraded in about 6 months, preferably about 99% degraded in about 6 months, or preferably about 99.99% degraded in about 6 months. In other embodiments, the terms biodegradable includes compositions that are at least 1% degraded in about 3 months, preferably about 10% degraded in about 3 months, preferably about 20% degraded in about 3 months, preferably about 30% degraded in about 3 months, preferably about 40% degraded in about 3 months, preferably about 50% degraded in about 3 months, preferably about 60% degraded in about 3 months, preferably about 70% degraded in about 3 months, preferably about 80% degraded in about 3 months, preferably about 90% degraded in about 3 months, preferably about 99% degraded in about 3 months, or preferably about 99.99% degraded in about 3 months. In other embodiments, the terms biodegradable includes compositions that are at least 1% degraded in about 1 month, preferably about 10% degraded in about 1 month, preferably about 20% degraded in about 1 month, preferably about 30% degraded in about 1 month, preferably about 40% degraded in about 1 month, preferably about 50% degraded in about 1 month, preferably about 60% degraded in about 1 month, preferably about 70% degraded in about 1 month, preferably about 80% degraded in about 1 month, preferably about 90% degraded in about 1 month, preferably about 99% degraded in about 1 month, or preferably about 99.99% degraded in about 1 month.

The compositions of the invention are both biodegradable and compostable as illustrated below in Table 1. The degradation and compostability rates of ecoresin formulations at different thicknesses and temperatures are illustrated in Table 1.

Tests were performed according to following testing guidelines outlined by:

a. ASTM D6400 b. EN13432 c. ISO14885 d. ASTM D5338 e. AS5810

In certain embodiments, the rate of decomposition/degradation and compostability is unpredictable due to the varying rate of microbial activity as well as the rate of disintegration/biodegradation once the microbes have acclimated to a new specimen in the soil. In various embodiments, test results may be impacted by a difference in the biological activity in soil specimen (e.g., soil rich in microbial activity versus a drier soil with low activity) as well as the test setup (e.g., location of desiccator, type of desiccator, frequency and method of soil aeration).

TABLE 1

| Bioplastic | Environment | Avg Disintegration Starting Point | Avg Disintegration %/Days | Avg Ecotoxicity |
|---|---|---|---|---|
| EcoResin Formulations | Ambient Temperature in soil | Within 7 days | ~90% in 180-365 Days | >90% plant germination rate retained compared to compost No PTFE content or PFAS contamination No Heavy Metal content |

As set forth herein, the compositions include biodegradable components. Suitable biodegradable materials that may be included in accordance with the embodiments of the invention include borate glass, polyglycolic acid (PGA), polylactic acid (PLA), a biodegradable rubber, biodegradable polymers, galvanically-corrodible metals, dissolvable metals, dehydrated salts, and any combination thereof. The biodegradable materials may be configured to degrade by a number of mechanisms including, but not limited to, swelling, dissolving, undergoing a chemical change, electrochemical reactions, undergoing thermal degradation, or any combination of the foregoing.

Degradation by swelling involves the absorption by the biodegradable material of aqueous fluids or hydrocarbon fluids present within the wellbore environment such that the mechanical properties of the biodegradable material degrade or fail. Exemplary hydrocarbon fluids that may swell and degrade the biodegradable material include, but are not limited to, crude oil, a fractional distillate of crude oil, a saturated hydrocarbon, an unsaturated hydrocarbon, a branched hydrocarbon, a cyclic hydrocarbon, and any combination thereof. Exemplary aqueous fluids that may swell to degrade the biodegradable material include, but are not limited to, fresh water, saltwater (e.g., water containing one or more salts dissolved therein), brine (e.g., saturated salt water), seawater, acid, bases, or combinations thereof. In degradation by swelling, the biodegradable material continues to absorb the aqueous and/or hydrocarbon fluid until its mechanical properties are no longer capable of maintaining the integrity of the biodegradable material and it at least partially falls apart. In some embodiments, the biodegradable material may be designed to only partially degrade by swelling in order to ensure that the mechanical properties of the component formed from the biodegradable material is sufficiently capable of lasting for the duration of the specific operation in which it is utilized.

Degradation by dissolving involves a biodegradable material that is soluble or otherwise susceptible to an aqueous fluid or a hydrocarbon fluid, such that the aqueous or hydrocarbon fluid is not necessarily incorporated into the biodegradable material (as is the case with degradation by swelling), but becomes soluble upon contact with the aqueous or hydrocarbon fluid.

Degradation by undergoing a chemical change may involve breaking the bonds of the backbone of the biodegradable material (e.g., a polymer backbone) or causing the bonds of the biodegradable material to crosslink, such that the biodegradable material becomes brittle and breaks into small pieces upon contact with even small forces expected in the wellbore environment.

Thermal degradation of the biodegradable material involves a chemical decomposition due to heat, such as the heat present in a wellbore environment. Thermal degradation of some biodegradable materials mentioned or contemplated herein may occur at wellbore environment temperatures that exceed about 90° C. (or about 200° F.).

With respect to biodegradable polymers used as a biodegradable material, a polymer is considered to be "biodegradable" if the degradation is due to, in situ, a chemical and/or radical process such as hydrolysis, oxidation, or UV radiation. Biodegradable polymers, which may be either natural or synthetic polymers, include, but are not limited to, polyacrylics, and polyamides. Suitable examples of biodegradable polymers that may be used in accordance with the embodiments of the present invention include polysaccharides such as dextran or cellulose, chitins, chitosans, proteins, aliphatic polyesters, poly(lactides), poly(glycolides), poly(epsilon-caprolactones), poly(hydroxybutyrates), poly(anhydrides), aliphatic or aromatic polycarbonates, poly(orthoesters), poly(amino acids), poly(ethylene oxides), polyphosphazenes, poly(phenyllactides), polyepichlorohydrins, copolymers of ethylene oxide/polyepichlorohydrin, terpolymers of epichlorohydrin/ethylene oxide/allyl glycidyl ether, and any combination thereof. Of these biodegradable polymers, as mentioned above, polyglycolic acid and polylactic acid may be preferred. Polyglycolic acid and polylactic acid tend to degrade by hydrolysis as the temperature increases.

Polyanhydrides are another type of particularly suitable biodegradable polymer useful in the embodiments of the present disclosure. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

In certain non-limiting embodiments, the biodegradable composition exhibits one or more of the following mechanical and physical properties:
  a rigidity (modulus) of more than 500 MPa,
  a tensile strength of more than 12 MPa,
  a flexural strength of more than 30 MPa,
  a heat deflection temperature (HDT) of more than 60° C.,
  a notched impact strength (impact resistance) of more than 20 J/m.
  a melt flow index (MFI), also known as melt flow rate (MFR), of more than 5 g/10 min.

More specifically in other certain non-limiting embodiments, the biodegradable composition exhibits one or more of the following mechanical and physical properties:
  a rigidity (modulus) of more than 1000 MPa,
  a tensile strength of more than 20 MPa,
  a flexural strength of more than 40 MPa,
  a heat deflection temperature (HDT) of more than 90° C.,
  a notched impact strength (impact resistance) of more than 30 J/m.
  a melt flow index (MFI), also known as melt flow rate (MFR), of more than 15 g/10 min.

Methods of Manufacturing the Biodegradable Compositions

In addition, an embodiment of the present invention further includes a method for preparing the biodegradable compositions.

In one embodiment, the invention encompasses a method for preparing the biodegradable composition comprising:
  mixing uniformly all materials of the biodegradable composition to prepare a premix, and then
  mixing the premix thoroughly at higher than ambient temperatures to prepare the biodegradable composition.

In various embodiments, the method includes combining the polymer, starch, inorganic filler, and fiber, optionally with the plasticizer, coupling agent, and mixing uniformly with other materials of the biodegradable plastic to prepare a premix.

In one embodiment, a polymer, starch, inorganic filler, and fiber is mixed uniformly with other raw materials for preparing the biodegradable composition and dried to prepare a premix. Other raw materials can be added for preparing the biodegradable compositions and then dried. In certain embodiments, the mixing method is mixing by stirring.

The premix composition can then be molded to prepare the biodegradable composition. Specifically, the molding method is injection molding or extrusion molding. In one embodiment, the step of molding the premix includes banburying the premix and then performing injection molding, where the banburying is performed at a temperature of about 140-195° C. Banburying the premix at 140-195° C. may fully and uniformly mix the bioplastic. Further, the banburying is performed at a temperature of 140-175° C. Even further, the banburying is performed at a temperature of 140-160° C.

In one embodiment, the step of molding the premix includes: extruding the premix with twin screws, where the extrusion is performed at a temperature of 140-195° C.

Further, the extrusion is performed at a temperature of 140-195° C. In an optional specific example, the premix is extruded, stretched and pelletized in a twin-screw extruder to prepare the biodegradable plastic.

It should be understood that in other embodiments, the molding process for the biodegradable plastic is not limited to the above process, but may also be other processes commonly used in the art.

The method for preparing the biodegradable composition is efficient to operate, and beneficial to industrial production.

In addition, an implementation of the invention further provides a disposable product, and the disposable product includes the biodegradable plastic according to any of the above embodiments or is prepared by using the method for preparing the biodegradable plastic according to any of the above embodiments.

The disposable product includes the biodegradable plastic, and has good mechanical properties and degradation cycle and a low preparation cost.

The components of the biodegradable compositions, with any optional included additives, are added and mixed until a homogeneous mixture is generated. Varying amounts of additional materials can be added to facilitate different types of molding, since the form of the pre-molded product is dependent on the mold, heating rate and drying/melt time. If the product is to be molded by classic injection methods the material is thinner, if the material is molded on the equipment described below the mixture is thicker. The material can also be rolled into green sheets and molded, extruded and made into dry pellets for other processes. The means of production for the product could be created from any of several possible process approaches. Specific methodologies are described herein, but these descriptions is intended only to describe one possible means of production, and shall not be construed in any way to represent a limitation to the outlined approach. While the compression molding process detailed herein is useful, other types of compression molding, injection molding, extrusion, casting, pneumatic shaping, vacuum molding can be used.

In another embodiment, once the moldable mixture has been prepared, it is positioned within a heated mold cavity. The heated mold cavity can comprise many different embodiments, including molds typically used in conventional injection molding processes and die-press molds brought together after placing the inorganically filled mixture into the female mold. In one preferred embodiment, for example, the moldable mixture is placed inside a heated female mold. Thereafter, a heated male mold is complementarily mated with the heated female mold, thereby positioning the mixture between the molds. As the mixture is heated, the starch-based binder gelates, increasing the viscosity of the mixture. Simultaneously, the mixture increases in volume within the heated molds cavity as a result of the formation of gas bubbles from the evaporating solvent, which are initially trapped within the viscous matrix. By selectively controlling the thermodynamic parameters applied to the mixture (e.g., pressure, temperature, and time), as well as the viscosity and solvent content, the mixture can be formed into a form-stable article having a selectively designed cellular structural matrix.

In a non-limiting embodiment, a temperature between about 100 and about 250° C. is used for baking for a time period of 60-90 seconds, preferably 75 seconds. Temperatures can vary based on the article being manufactured, for example, for the rapid production of thin-walled articles, such as cups. Thicker articles require a longer time to remove the solvent and are preferably heated at lower temperatures to reduce the propensity of burning the starch-based binder and fiber. Leaving the articles within the locked molds too long can also result in cracking or deformation of the articles.

The temperature of the mold can also affect the surface texture of the molds. Once the outside skin is formed, the solvent remaining within the interior section of the mixture escapes by passing through minute openings in the outside skin and then traveling between the skin and the mold surface to the vent holes. If one mold is hotter than the other, the laws of thermodynamics would predict, and it has been empirically found, that the steam will tend to travel to the cooler mold. As a result, the surface of the article against the hotter mold will have a smoother and more uniform surface than the surface against the cooler mold.

A variety of articles can be produced from the processes and compositions of the present invention. The terms "article" and "article of manufacture" as used herein are intended to include all goods that can be formed using the disclosed process.

Types of Articles Produced Using the Compositions of the Invention

Containers suitable for holding dry materials can be used to hold dried fruit, or raw nuts such as almonds. Containers suitable for holding damp materials can be used to hold fresh mushrooms or tomatoes (for example in groups of 4 or 6) and should be able to perform this function for a period of at least about two to three weeks since normal packing to use time is about 14 days. Damp food packing can also be used with a hot fast food item such as French fries or hamburger, in which case the container needs to last for only a short time, for example about one hour after addition of the damp food. Damp food packing could also be used, in combination with an adsorbent pad, to package raw meat. In this case, the container needs to withstand exposure to the meat for a period of seven days or longer and desirably can stand at least one cycle of freeze and thaw. If possible this package should be able to withstand a microwave signal. When formulated for holding wet foods, the containers of the invention will suitably have the ability to hold a hot liquid, such as a bowl of soup, a cup of coffee or other food item for a period of time sufficient to allow consumption before cooling, for example within one hour of purchase. Such containers can also be used to hold a dry product that will be re-hydrated with hot water such as the soup-in-a-cup products.

Articles made from the invention can be manufactured into a wide variety of finished articles that can presently be made plastics, paper, paperboard, polystyrene, metals, ceramics, and other materials. Merely by way of example, it is possible to manufacture the following exemplary articles: films, bags, containers, including disposable and non-disposable food or beverage containers, cereal boxes, sandwich containers, "clam shell" containers (including, but not limited to, hinged containers used with fast-food sandwiches such as hamburgers), drinking straws, baggies, golf tees, buttons, frozen food boxes, milk cartons, fruit juice containers, yogurt containers, beverage carriers (including, but not limited to, wraparound basket-style carriers, and "six pack" ring-style carriers), ice cream cartons, cups, French fry containers, fast food carryout boxes, packaging materials such as wrapping paper, spacing material, flexible packaging such as bags for snack foods, bags with an open end such as grocery bags, bags within cartons such as a dry cereal box, multi-well bags, sacks, wraparound casing, support cards for products which are displayed with a cover (particularly plastic covers disposed over food products such as lunch meats, office products, cosmetics, hardware items, and toys), computer chip boards, support trays for supporting products (such as cookies and candy bars), cans, tape, and wraps (including, but not limited to, freezer wraps, tire wraps, butcher wraps, meat wraps, and sausage wraps); a variety of cartons and boxes such as corrugated boxes, cigar boxes, confectionery boxes, and boxes for cosmetics, convoluted or spiral would containers for various products (such as frozen juice concentrate, oatmeal, potato chips, ice cream, salt, detergent, and motor oil), mailing tubes, sheet tubes for rolling materials (such as wrapping paper, cloth materials, paper towels and toilet paper), and sleeves; printed materials and office supplies such as books, magazines, brochures, envelopes, gummed tape, postcards, three-ring binders, book covers, folders, and pencils, various eating utensils and storage containers such as dishes, lids, straws, cutlery, knives, forks, spoons, bottles, jars, cases, crates, trays, baking trays, bowls, microwaveable dinner trays, dinner trays, egg cartons, meat packaging platters, disposable plates, vending plates, pie plates, and breakfast plates, medicine vials, coatings, laminates, emergency emesis receptacles, substantially spherical objects, or toys.

The container should be capable of holding its contents, whether stationary or in movement or handling, while maintaining its structural integrity and that of the materials contained therein or thereon. This does not mean that the container is required to withstand strong or even minimal external forces. In fact, it can be desirable in some cases for a particular container to be extremely fragile or perishable. The container should, however, be capable of performing the function for which it was intended. The necessary properties can always be designed into the material and structure of the container beforehand.

The container should also be capable of containing its goods and maintaining its integrity for a sufficient period of time to satisfy its intended use. It will be appreciated that, under certain circumstances, the container can seal the contents from the external environments, and in other circumstances can merely hold or retain the contents.

The terms "container" or "containers" as used herein, are intended to include any receptacle or vessel utilized for, e.g., packaging, storing, shipping, serving, portioning, or dispensing various types of products or objects (including both solids and liquids), whether such use is intended to be for a short-term or a long-term duration of time.

Containment products used in conjunction with the containers are also intended to be included within the term "containers." Such products include, for example, lids, straws, interior packaging, such as partitions, liners, anchor pads, corner braces, corner protectors, clearance pads, hinged sheets, trays, funnels, cushioning materials, and other object used in packaging, storing, shipping, portioning, serving, or dispensing an object within a container.

The containers within the purview of the present invention can or cannot be classified as being disposable. In some cases, where a stronger, more durable construction is required, the container might be capable of repeated use. On the other hand, the container might be manufactured in such a way so as to be economical for it to be used only once and then discarded. The present containers have a composition such that they can be readily discarded or thrown away in conventional waste landfill areas as an environmentally neutral material.

The articles within the scope of the present invention can have greatly varying thicknesses depending on the particular application for which the article is intended. They can be as thin as about 1 mm for uses such as in a cup. In contrast, they can be as thick as needed where strength, durability, and or bulk are important considerations. For example, the article can be up to about 10 cm thick or more to act as a specialized packing container or cooler. The preferred thickness for most articles is in a range from about 1.5 mm to about 1 cm, with about 2 mm to about 6 mm preferred.

Using a microstructural engineering approach, the present invention can produce a variety of articles, including plates, cups, cartons, and other types of containers and articles having mechanical properties substantially similar or even superior to their counterparts made from conventional materials, such as paper, polystyrene foam, plastic, metal and glass. The minimal cost is a result of the relatively inexpensive aggregate which typically comprises a large percentage of the mixture and the minimum processing energy required.

The method of the present invention provides basic methodologies which can be utilized with little modification and a basic material from which product items can be produced by tailoring of the additives and additional processing steps employed.

EXAMPLES

Specific Embodiments of the Biodegradable Compositions

The present invention will be described in detail with reference to specific embodiments. Unless otherwise specified, chemicals and instruments used in the embodiments are conventional choices in the art. Experimental methods without specific conditions specified in the embodiments are implemented according to conventional conditions such as those described in documents and books or by using methods recommended by the manufacturer.

In certain embodiments, the biodegradable composition includes the illustrative, exemplary, non-limiting components set forth in Table 2:

TABLE 2

| General Name of Component | Exemplary Components |
|---|---|
| Polymer | PBS, PLA, PHAs, PBAT, PBSA, PCL, PBST |
| Organic Filler (Starch) | Starch - native or TPS (thermoplastic starch) |
| Natural Fiber | Lignocellulosic matter either as pure cellulose or agricultural residues, hemp, wood, and perennial grasses in the form of straws, stalks, hurd, bast, leaf, seed, fruit in a non-continuous non-woven form (small, chopped fibers, particulates or flour) |
| Plasticizer | glycerin, vegetable oils (virgin or epoxidized), low molecular weight grades of bioplastics in item #1, natural waxes, etc. |
| Inorganic Filler | $CaCO_3$, wollastonite, mica, talc, aluminum silicate, |
| Other Additives | bio-based impact modifiers, compatibilizers, coupling agents, pigments, chain extenders, lubricants, stabilizers, initiators, antistatic agents, flame retardants, antioxidants |

In certain embodiments, the biodegradable composition includes the formulation set forth in Table 3:

Embodiment 1

In this embodiment, raw materials for preparing a biodegradable plastic include: 80 parts of polymer, 5 parts of fiber, 5 parts of starch, 2 parts of plasticizer and 1 part of coupling agent, where the polymer is PLA, the fiber is straw, the plasticizer is ethylene glycol, and the coupling agent is titanate.

A method for preparing the biodegradable plastic in the embodiment includes but is not limited to the following steps:

plasticizing the starch with the plasticizer, and mixing uniformly with other raw materials and drying to prepare a premix; then melt-blending the premix in a twin-screw extruder and then stretching and pelletizing to prepare the biodegradable plastic in this embodiment, where the extrusion is performed at a temperature of 150° C.

Tests

The tensile strength and elongation at break of the biodegradable plastic in this embodiment were tested by using methods specified in GB/T 1040.1-2018, and the melt mass-flow rate of the biodegradable plastic in this embodiment was tested by using a method specified in GB/T 3682-2000.

Test results show that the tensile strength, the elongation at break and the melt mass-flow rate (g/10 min) of the biodegradable plastic prepared in this embodiment were 43.6 MPa, 8.2% and 23.8, respectively.

Embodiment 2

Raw materials for preparing a biodegradable plastic in the embodiment include: 90 parts of polymer, 5 parts of fiber, 5 parts of starch, 1.5 parts of plasticizer and 1 part of coupling agent, where the polymer is a mixture of PBS and PBAT (the mixture consists of 80 parts of PBS and 10 parts of PBAT), the fiber is wood flour, the plasticizer is xylitol, and the coupling agent is aluminate.

A method for preparing the biodegradable plastic in the embodiment includes but is not limited to the following steps:

plasticizing the starch with the plasticizer, and mixing uniformly with other raw materials and drying to prepare a premix; then melt-blending the premix in a twin-screw extruder and then stretching and pelletizing to prepare the biodegradable plastic in this embodiment, where the extrusion is performed at a temperature of 150° C.

Test

The tensile strength and elongation at break of the biodegradable plastic in this embodiment were tested by using methods specified in GB/T 1040.1-2018, and the melt mass-flow rate of the biodegradable plastic in the embodiment was tested by using a method specified in GB/T 3682-2000.

Test results show that the tensile strength, the elongation at break and the melt mass-flow rate (g/10 min) of the biodegradable plastic prepared in this embodiment were 26.3 MPa, 24.2% and 15.2, respectively.

Comparative Example 1

Raw materials for preparing a biodegradable plastic in the comparative example include: 5 parts of fiber, 30 parts of starch, 10 parts of plasticizer and 1 part of coupling agent, where the fiber is vinasse, the plasticizer is glycerin and the coupling agent is KH550.

A method for preparing the biodegradable plastic in this comparative example includes but is not limited to the following steps:

plasticizing the starch with the plasticizer, and mixing uniformly with other raw materials and drying to prepare a premix; then melt-blending the premix in a twin-screw extruder and then stretching and pelletizing to prepare the biodegradable plastic in this comparative example, where the extrusion is performed at a temperature of 150° C.

Test

The tensile strength and elongation at break of the biodegradable plastic in Comparative Example 1 were tested by using methods specified in GB/T 1040.1-2018, and the melt mass-flow rate of the biodegradable plastic in Comparative Example 1 was tested by using a method specified in GB/T 3682-2000.

Test results show that the tensile strength and the elongation at break of the biodegradable plastic prepared in Comparative Example 1 were 2.6 MPa and 1.7% respectively, and the melt mass-flow rate (g/10 min) could not be measured (very small).

In conclusion, the tensile strength, the elongation at break and the melt mass-flow rate (g/10 min) of the biodegradable plastics in Embodiment 1 and Embodiment 2 were 26.3-43.6 MPa, 8.2-24.2% and 15.2-23.8 respectively, showing good mechanical properties and processability. In addition, the raw materials for preparing the biodegradable plastics in Embodiment 1 and Embodiment 2 are raw materials with short degradation cycles, and the biodegradable plastics also have a short degradation cycle after molding.

Embodiment 3

Compostable plant-based EcoResins are developed using the claimed technology, and are designed specifically for replacing traditional plastic resins. These biodegradable and compostable eco-resins demonstrate rapid biodegradability rates. The compositions made from the claimed embodiments include resin of similar functions to traditional polypropylene, lower processing temperatures, and a better world without plastic pollution.

TABLE 3

| EcoResin Datasheet | UNIT | ASTM | Ecoresin |
|---|---|---|---|
| Melt Flow Rate (190° C., 2.16 kg) | g/10 min | D1238 | 10-20 |
| Water Absorption(23° C., 24 hrs) | % | D570 | 1-5 |
| Tensile Strength at break (50 mm/min) | Mpa | D638 | 20-30 |
| Elongation at Break | % | D638 | 10-20 |
| Peak Melt Temperature | ° C. | D3418 | 100-180 |

Embodiments 4-6

Embodiments 4-6

Biodegradable plant-based EcoResins developed using the claimed technology, which are designed specifically to simultaneously exhibit:

a rigidity (represented by 1% secant flexural modulus) of more than 1000 MPa according to ASTM D790, a strength (represented by maximum flexural stress) of more than 30 MPa according to ASTM D790, an impact strength (represented by notched Izod energy) of more than 30 J/m according to ASTM D256, an MFI (melt flow index or melt flow rate) of more than 15 g/10 min according to ASTM D1238, and a theoretically calculated bio-based carbon content of more than 50%

Examples of such formulations with one or more biodegradable plastics, a natural fiber (dried vinasse), plasticized starch, an inorganic filler and a silane coupling agent are included in Table 3.

TABLE 3

| Plasticized starch wt. % | Dried vinasse wt. % | Inorganic filler wt. % | Flexural Modulus (MPa) | Flexural Strength (MPa) | Impact Strength (J/m) | MFI (g/10 min) | Bio-based carbon content (theoretical calculation) |
|---|---|---|---|---|---|---|---|
| 30 | 12.5 | 2.5 | 1140 | 33 | 35 | 26 | 62% |
| 20 | 25 | 0 | 1050 | 31 | 35 | 21 | 66% |
| 4 | 12 | 29 | 1150 | 30 | 47 | 18 | 54% |

The above-mentioned embodiments are only some implementations of the present invention, and should not be construed as limiting the scope of the patent for the invention despite specific and detailed description. It should be noted that for a person of ordinary skill in the art, several modifications and improvements can be made without departing from the concept of the present invention, and these modifications and improvements should fall within the protection scope of the present invention. Therefore, the protection scope of the patent for invention shall be subject to the appended claims.

Various technical features in the above-mentioned embodiments can be combined in any way, and for the sake of brevity, all possible combinations of the technical features in the above embodiments are not described. However, provided that combinations of these technical features have no contradiction, the combinations should be regarded as falling within the scope of the specification.

What is claimed is:

1. A biodegradable composition comprising:
   (i) about 50-60% (w/w) of a polymer comprising one or more of biodegradable polyesters;
   (ii) about 5-15% (w/w) of starch;
   (iii) about 20-40% (w/w) of one or more of inorganic filler; and
   (iv) about 0.1-10% (w/w) of fiber comprising one or more of biomass,
   wherein the composition exhibits a 90% disintegration completion within about 180 to about 365 days in soil.

2. The biodegradable composition of claim 1, further comprising one or more of the following additives: (i) a plasticizer in an amount of from about 0.1 to about 5% (w/w); (ii) a coupling agent in an amount of from about 0.1 to about 10% (w/w); (iii) a compatibilizer in an amount of from about 0.1 to about 10% (w/w); (iv) an impact modifier in an amount of about 0.1 to about 30% (w/w), (v) a chain extender in an amount of about 0.1 to about 10% (w/w), (vi) lubricant in an amount of about 0.1 to about 10% (w/w), (vii) a stabilizer in an amount of about 0.1 to about 10% (w/w), (viii) toner in an amount of about 0.1 to about 10% (w/w), or (ix) pigment in an amount of about 0.1 to about 10% (w/w), or combinations thereof.

3. The biodegradable composition of claim 1, wherein composition exhibits a disintegration onset within 7 days, on average.

4. The biodegradable composition of claim 1, wherein composition exhibits a bio-based carbon content of more than 50%.

5. The biodegradable composition of claim 1, wherein composition exhibits a 1% secant flexural modulus of greater than 1000 MPa.

6. The biodegradable composition of claim 1, wherein composition exhibits a flexural stress of greater than 30 MPa.

7. The biodegradable composition of claim 1, wherein composition exhibits a notched Izod energy of more than 30 J/m.

8. The biodegradable composition of claim 1, wherein composition exhibits a melt flow index or melt flow rate of greater than 10 g/10 min.

9. The biodegradable composition of claim 2, wherein composition exhibits a melt flow index or melt flow rate of less than 10 g/10 min.

10. The biodegradable composition of claim 1, wherein the polymer is one or more of biodegradable polyester is polylactic acid, polycaprolactone, polybutylene succinate, polybutylene succinate adipate, polybutylene succinate terephthalate, polybutylene adipate terephthalate, or polyhydroxyalkanoates.

11. The biodegradable composition of claim 1, wherein the starch is in native form or modified form including but not limited to thermoplastic starch.

12. The biodegradable composition of claim 1, wherein the biomass comprises vinasse, vinegar residues, wood fiber, agricultural cellulosic matter from including straw, stalk, shive, hurd, bast, leaf, seed, fruit, and perennial grass, all in a non-continuous non-woven form including chopped pieces, particulates, dust or flour.

13. The biodegradable composition of claim 1, wherein the inorganic filler includes, but is not limited to, wollastonite, mica, clay, calcium carbonate, glass fiber, talc, aluminum silicate, zirconium oxide, and gypsum.

14. The biodegradable composition of claim 2, wherein the plasticizer includes, but is not limited to, glycerin, ethylene glycol, xylitol, virgin or epoxidized vegetable oils and natural waxes.

15. The biodegradable composition of claim 2, wherein the coupling agent or compatibilizer includes, but is not limited to, titanate, aluminate, γ-aminopropyltriethoxysilane, γ-(2,3)epoxy (propoxy)propyltrimethoxysilane and γ-methacryloxypropyltrimethoxysilane.

16. The biodegradable composition of claim 2, wherein the toner or pigment is fluorescent brightener or titanium dioxide.

17. A method for preparing the biodegradable composition of claim 2 comprising the following steps:
   a) plasticizing the starch with a plasticizer;
   b) mixing uniformly with other raw materials of the biodegradable composition to prepare a premix;
   c) mixing the premix thoroughly at higher than ambient temperatures to prepare the biodegradable composition.

18. A method for preparing the biodegradable composition of claim 1 comprising the following steps:
   a) mixing uniformly all materials of the biodegradable composition to prepare a premix, and then
   b) mixing the premix thoroughly at higher than ambient temperatures to prepare the biodegradable composition.

19. A method for preparing the biodegradable composition of claim 2 comprising the following steps:
   a) feeding all materials of the biodegradable composition, individually or premixed with some other materials of the biodegradable composition, simultaneously into a mixer through more than one feeder
   b) mixing all materials of the biodegradable composition thoroughly at higher than ambient temperatures to prepare the biodegradable composition.

20. The method of claim 19, further comprising forming rigid parts using conventional polymer processing techniques comprising injection molding, compression molding, blow molding and extrusion molding.

21. The method of claim 19, further comprising forming thin sheets or films using conventional polymer processing techniques comprising hot press, vacuum forming, cast extrusion, film blowing, or compression molding.

22. A disposable product, comprising the biodegradable composition of claim 1, wherein the disposable product is packing material or a consumer product.

* * * * *